(12) United States Patent
Takahata et al.

(10) Patent No.: US 8,510,042 B2
(45) Date of Patent: Aug. 13, 2013

(54) NAVIGATION DEVICE AND DATA UPDATE SYSTEM

(75) Inventors: Seiji Takahata, Nishio (JP); Kimiyoshi Sawai, Okazaki (JP); Tomoki Kodan, Nagoya (JP); Hironobu Sugimoto, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 710 days.

(21) Appl. No.: 12/448,564

(22) PCT Filed: Feb. 28, 2008

(86) PCT No.: PCT/JP2008/054099
§ 371 (c)(1),
(2), (4) Date: Jul. 2, 2010

(87) PCT Pub. No.: WO2008/108449
PCT Pub. Date: Sep. 12, 2008

(65) Prior Publication Data
US 2010/0274469 A1    Oct. 28, 2010

(30) Foreign Application Priority Data
Feb. 28, 2007 (JP) ................................. 2007-049336

(51) Int. Cl.
*G01C 21/26* (2006.01)
(52) U.S. Cl.
USPC ........................................ 701/450; 701/451
(58) Field of Classification Search
USPC ........................ 701/450, 451, 532
See application file for complete search history.

(56) References Cited

U.S. PATENT DOCUMENTS

| 6,546,334 B1 * | 4/2003 | Fukuchi et al. ............... 701/532 |
| 6,766,248 B2 * | 7/2004 | Miyahara ...................... 701/532 |
| 6,980,907 B2 * | 12/2005 | Umezu et al. ................. 701/532 |
| 7,584,049 B2 * | 9/2009 | Nomura ......................... 701/425 |
| 7,711,473 B2 * | 5/2010 | Sekine et al. .................. 701/451 |

(Continued)

FOREIGN PATENT DOCUMENTS

| EP | 1 669 723 A | 6/2006 |
| JP | A-2003-091234 | 3/2003 |

(Continued)

OTHER PUBLICATIONS

Japanese Patent Office, Notification of Reason for Refusal mailed Sep. 1, 2011 in Japanese Patent Application No. 2007-049336 w/Partial English-language Translation.

*Primary Examiner* — Joseph C Rodriguez
(74) *Attorney, Agent, or Firm* — Oliff & Berridge, PLC

(57) ABSTRACT

Data in an update data format for performing an update of reference map data is formed by storing in each data frame divided for each data type, at least one of: a first group of one or more common map data records to be stored according to the data type of each data frame in a common map data frame after a conversion by a conversion unit; a second group of one or more first map data records to be stored according to the data type of each data frame in a first map data frame after a conversion by a conversion unit; and a third group of one or more second map data records to be stored according to the data type of each data frame in a second map data frame after a conversion by a conversion unit.

11 Claims, 11 Drawing Sheets

(56) References Cited

U.S. PATENT DOCUMENTS

| | | | |
|---|---|---|---|
| 7,890,255 B2 * | 2/2011 | Ikeuchi et al. | 701/450 |
| 8,073,617 B2 * | 12/2011 | Nakamura | 701/411 |
| 8,249,801 B2 * | 8/2012 | Sakai et al. | 701/408 |
| 2003/0220735 A1 | 11/2003 | Nimura | |
| 2004/0085227 A1 | 5/2004 | Mikuriya et al. | |

FOREIGN PATENT DOCUMENTS

| | | |
|---|---|---|
| JP | A-2004-117983 | 4/2004 |
| JP | A-2004-157172 | 6/2004 |
| JP | A-2004-177245 | 6/2004 |
| JP | A-2004-177246 | 6/2004 |
| JP | A-2004-178248 | 6/2004 |
| JP | A-2004-309705 | 11/2004 |
| WO | WO 2004/008073 A1 | 1/2004 |

* cited by examiner

NAVIGATION DEVICE AND DATA UPDATE SYSTEM

TECHNICAL FIELD

The present invention relates to a navigation device which operates according to a plurality of application programs including at least a first program and a second program and in which reference map data referenced by these application programs is updatable, and a data update system including the navigation device.

BACKGROUND ART

It has been desired for navigation devices to accurately indicate the current state of roads, facilities, and the like of which map data used constantly changes. Therefore, it has been necessary to frequently update the map data. However, in conventional methods of providing map data recorded on a recording medium such as a DVD or CD, of performing a rewrite of map data in a hard disk by a dealer, and the like, a frequent update of map data has been difficult in terms of cost, time, and the like required for the update of map data. Accordingly, technology in which update data formed of update differential information of map data is provided from a server device to a navigation device, and a differential update of the map data stored in a recording medium such as a hard disk is performed by the navigation device using the update data has been known (for example, see Japanese Patent Application Publication No. JP-A-2004-178248). The navigation device performs various navigation processes such as a map display, a route search, and a route guidance using current position information acquired by a global positioning system (GPS) reception device or the like and the map data.

DISCLOSURE OF THE INVENTION

Problems to be Solved by the Invention

Navigation devices often include a plurality of application programs such as a map display program, a route search program, and a route guidance program for performing navigation processes such as a map display, a route search, and a route guidance. In such navigation devices, map data may be formed of a plurality of segmented application map data pieces in a format suitable for each of the plurality of application programs in order to improve the processing speed of each application program.

However, in a case where update data is provided to the navigation device having the plurality of application map data pieces, creating and transmitting a plurality of update data pieces for each of the plurality of application map data pieces would result in separately transmitting data contents overlapping among a plurality of the update data pieces. Thus, the amount of data transmission increases, possibly causing a problem such as increases in communication time and communication cost. On the other hand, reducing the amount of data transmission leads to an increase in update processing time when the update process of map data is complicated, possibly causing a problem of longer time from the reception of the update data until the latest updated data being made available.

In order to solve the problems described above, it is an object of the present invention to provide a navigation device which operates according to a plurality of application programs, the navigation device being capable of easily performing an update process of map data and capable of reducing the amount of update data to reduce the communication time and communication cost, and a data update system using the same.

Means for Solving the Problem

According to a first aspect of the present invention, a navigation device that operates according to a plurality of application programs including at least a first program and a second program, and reference map data in a reference data format referred to by the application programs being updatable, the navigation device includes: a conversion unit that converts data in a predetermined update data format into data in the reference data format; and a reference map data update unit that updates the reference map data with the data in the reference data format after conversion by the conversion unit; in which the reference map data is formed of a common map data frame commonly referred to by the plurality of application programs, a first map data frame referred to by the first program, and a second map data frame referred to by the second program; and the data in the update data format is formed by storing in each data frame divided for each data type, at least one of: a first group of one or more common map data records to be stored according to the data type of each data frame in the common map data frame after conversion by the conversion unit; a second group of one or more first map data records to be stored according to the data type of each data frame in the first map data frame after conversion by the conversion unit; and a third group of one or more second map data records to be stored according to the data type of each data frame in the second map data frame after conversion by the conversion unit.

According to the aspect, since the reference map data is updated by the reference map data update unit after converting the data in the update data format to the same data in reference data format as that of the reference map data by the conversion unit, it is possible to easily perform the updating process of the reference map data. The data in the update data format is formed by storing at least one of: the first group of the common map data records to be stored in the common map data frame; the second group of the first map data records to be stored in the first map data frame; and the third group of the second map data records to be stored in the second map data frame after conversion by the conversion unit, in each data frame divided for each data type. Accordingly, it is possible to group together as one data the data for update corresponding to each of a plurality of data frames of the reference map data. Further, it is possible to group together as the common map data record the data contents overlapping each other when creating a plurality of update data pieces for each of the plurality of application map data pieces. Therefore, it is possible to reduce the amount of data in the update data format, and also possible to reduce communication time and communication cost for transmitting the update data to the navigation device.

In the navigation device according to a second aspect of the present invention, the data in the update data format is update map data updatable by a predetermined update data file; the navigation device further includes: a local save database that stores the update map data; in which the conversion unit converts the update map data in the local save database to the reference map data.

According to the aspect, the navigation device is capable of performing the updating process for reflecting the update contents included in the update data file to the reference map data by updating the update map data in the local save database by the update data file, and by converting such updated update map data to the reference map data by the conversion unit. Here, the reference map data is in the data format suitable for the plurality of application programs to refer to, and is not in the data format suitable for updating. On the other hand, since the update map data is in the update data format suitable for the updating as above, it is possible to easily update the update map data by the update data file. By making such updated update map data converted by the conversion unit as the reference map data, it is possible to perform the updating process of the reference map data, and also possible to easily perform the updating process of the reference map data. Therefore, by the provision of the update data file from a server device or the like, it is possible to easily update the reference map data frequently, and also possible to maintain the map data of the navigation device in an updated state consistently.

In the navigation device according to a third aspect of the present invention, the update data file stores in each data frame divided for each data type, one or more of a common data record for updating the common map data records according to the data type of each data frame, a first update data record for updating the first map data records according to the data type of each data frame, and a second update data record for updating the second map data records according to the data type of each data frame.

According to the aspect, the update data file includes the data records for update corresponding to each data record in the update map data stored in the local save database. Therefore, it is possible to drastically simplify the update process of the update map data by the update data file.

In the navigation device according to a fourth aspect of the present invention, the conversion unit converts the update map data to the reference map data by sorting a plurality of data records included in the update map data and generating the common map data frame, the first map data frame, and the second map data frame of the reference map data.

According to the aspect, it is possible to generate the reference map data from the update map data stored in the local save database by conversion of the conversion unit.

In the navigation device according to a fifth aspect of the present invention, in place of the structure that the data in the update data format is the update map data stored in the local save database, the data in the update data format is data in an update data file for updating the reference map data; and the conversion unit coverts the data in the update data file to data in the reference data format having an update content of the reference map data.

According to the aspect, it is possible for the navigation device to, when the update data file is provided, update the reference map data by converting the data in the update data file to the data in the reference data format having an update content of the reference map data. Therefore, by the provision of the update data file from the server device or the like, it is possible to easily update the reference map data frequently, and also possible to maintain the map data of the navigation device in an updated state consistently.

In the navigation device according to a sixth aspect of the present invention, data stored in the common map data frame includes data relating to a road network formed by including a link and a node, and is commonly referred to by the plurality of application programs.

According to the aspect, it is possible to commonly reference from the plurality of application programs the data relating to the link and the node of the road network data forming the reference map data.

In the navigation device according to a seventh aspect of the present invention, the first program is at least one of a display program and a map-matching program; and data stored in the first map data frame includes data relating to a road shape of a road network of the reference map data. Further, in the navigation device according to an eighth aspect of the present invention, the second program is a route search program; and data stored in the second map data frame includes data relating to a traffic cost of each link forming the road network of the reference map data.

In the navigation device according to a ninth aspect of the present invention, the data in the reference data format is formed with the data records stored in at least one of the data frame being aligned in the order of the road network connection.

According to the aspect, it is possible to make the reference map data into a data format suitable for reference by each application program, and also possible to improve the processing speed of the application program.

According to a tenth aspect of the present invention, a data update system includes: the navigation device including the above features; and a server device that provides the update data file to the navigation device, the server device including: a comparison local save database that stores the same update map data as that of the local save database; a new data acceptance unit that accepts an input of new data; and an update data file generation unit that generates the update data file based on the update map data in the comparison local save database and the new data.

According to the aspect, it is possible for the server device to appropriately generate the update data file based on the content of the update map data in the local save database of the navigation device, based on the new input data.

In the data update system according to an eleventh aspect of the present invention, the server device further includes: a new update map data generation unit that generates new update map data updated with a content of the new data based on the update map data stored in the comparison local save database and the new data; in which the update data file generation unit generates the update data file based on the difference between the update map data stored in the comparison local save database and the new update map data.

According to the aspect, since the update data file is generated based on the map data before the update or after the update in the same data format as that of the update map data in the local save database, it is possible to easily generate the update data file in a format suitable for updating the update map data in the local save database.

BEST MODES FOR CARRYING OUT THE INVENTION

Figure 1:
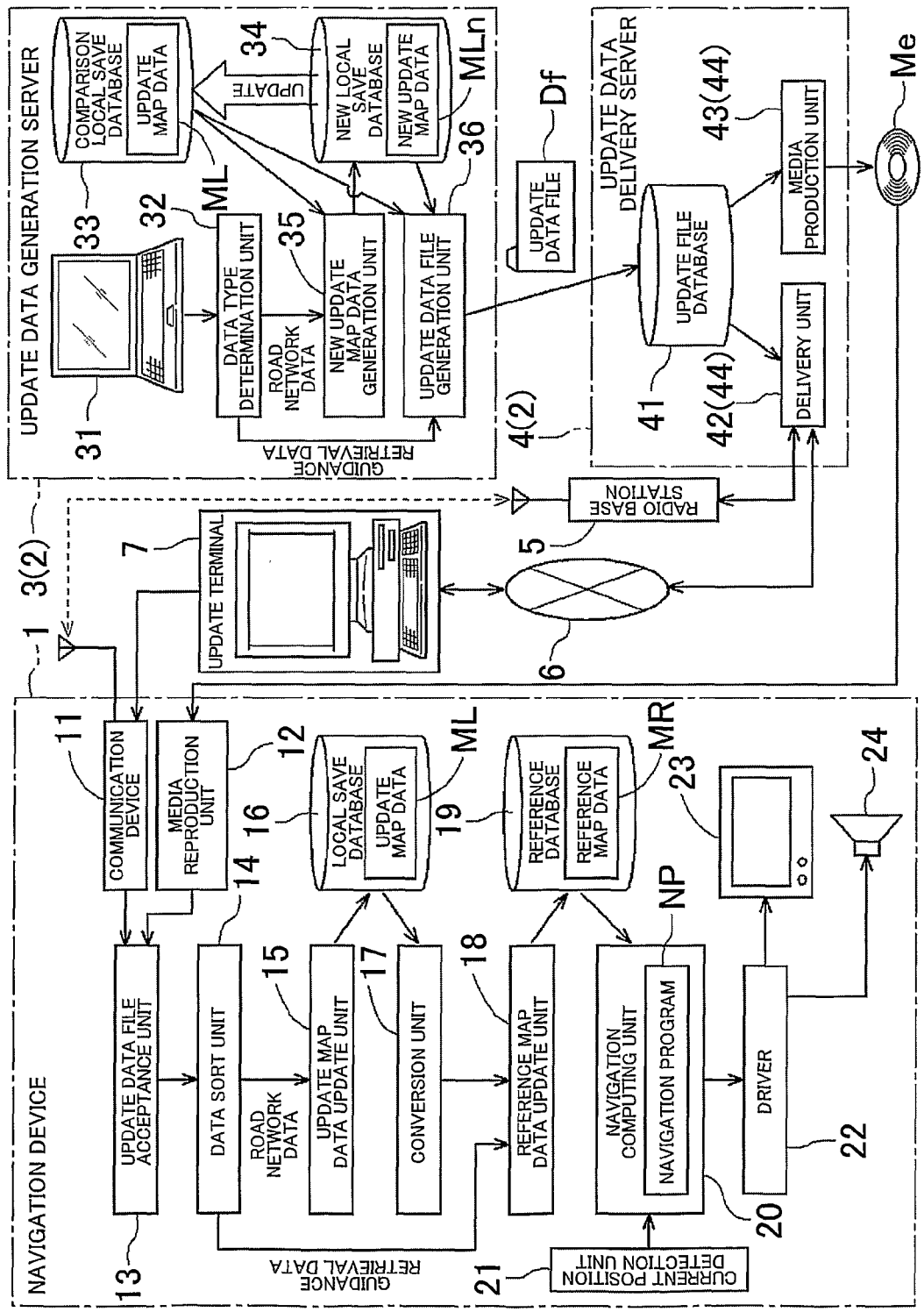
FIG. 1 is a block diagram showing a configuration of a data update system according to an embodiment of the present invention.

Embodiments of the present invention are described based on the drawings. FIG. 1 is a block diagram schematically showing a configuration of an entire data update system including a navigation device 1 according to this embodiment. In this embodiment, the data update system is a system which provides an update data file Df generated by an update data generation server 3 from an update data delivery server 4 to the navigation device 1 and performs an update of a reference database 19 as a map database for navigation. Thus, the data update system according to this embodiment includes the navigation device 1, the update data generation server 3, and the update data delivery server 4 as a main configuration. The update data generation server 3 and the update data delivery server 4 form a "server device 2" of the present invention.

Each unit forming the navigation device 1, the update data generation server 3, and the update data delivery server 4 is formed of a function section for performing various processes on the input data with a computing processing device such as a CPU as a main member, the function section being implemented by either or both of hardware and software (program). Each database included in the navigation device 1, the update data generation server 3, and the update data delivery server 4 includes a device having a rewritable storage medium, such as, for example, a hard disk drive and a flash memory, and a driving unit of the medium as the hardware configuration. Note that the term "database" is abbreviated as "DB" for the sake of convenience in each drawing of the present application. The configuration of each device is described below in order.

1. Configuration for Achieving Navigation Function of Navigation Device

The navigation device 1 includes a navigation computing unit 20, the reference database 19 storing reference map data MR, a current position detection unit 21, a driver 22, a display operation section 23, and a voice output section 24 as a configuration for achieving a navigation function such as a current position display, a route calculation from the point of departure to the destination, a course guidance to the destination, and a destination search.

Figure 2:
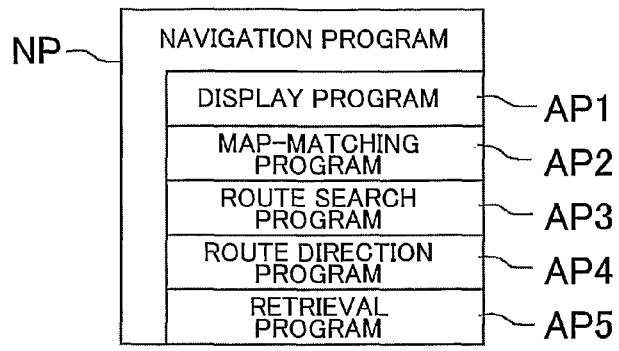
FIG. 2 is a diagram showing a configuration of a navigation program.

The navigation computing unit 20 is a computing processing unit which operates according to a navigation program NP for implementing the navigation function. FIG. 2 is a diagram schematically showing a configuration of the navigation program NP. As shown in the drawing, the navigation program NP includes a plurality of application programs AP1 to AP5. In this embodiment, the navigation program NP includes five application programs of a display program AP1, a map-matching program AP2, a route search program AP3, a route direction program AP4, and a retrieval program AP5. The display program AP1 is a program for performing map display showing the areas around the current position, the destination, or the like, current position display on the map, or the like on a display screen of the display operation section 23. The map-matching program AP2 is a program for performing a map-matching process of adjusting the current position detected by the current position detection unit 21 to be on a road in the map. The route search program AP3 is a program for searching, for example, a guidance route from the point of departure such as the current position to the destination input by the display operation section 23, or the like. The route direction program AP4 is a program for performing a process of directing the user along an appropriate course by a guidance display through the display screen of the display operation section 23, a voice guidance through the voice output section 24, or the like according to a route to the destination determined by the route search program AP3. The retrieval program AP5 is a program for retrieving the destination, a location for map display, or the like based on the address, telephone number, facility name, category, and the like. Note that since the operation process of each application program AP1 to AP5 by the navigation device 1 is publicly known, a detailed description thereof is omitted. Each of these application programs AP1 to AP5 refers to the reference map data MR stored in the reference database 19 in the operation process. In this embodiment, the display program AP1 and the map-matching program AP2 correspond to a "first program" of the present invention, and the route search program AP3 corresponds to a "second program" of the present invention.

Figure 3:
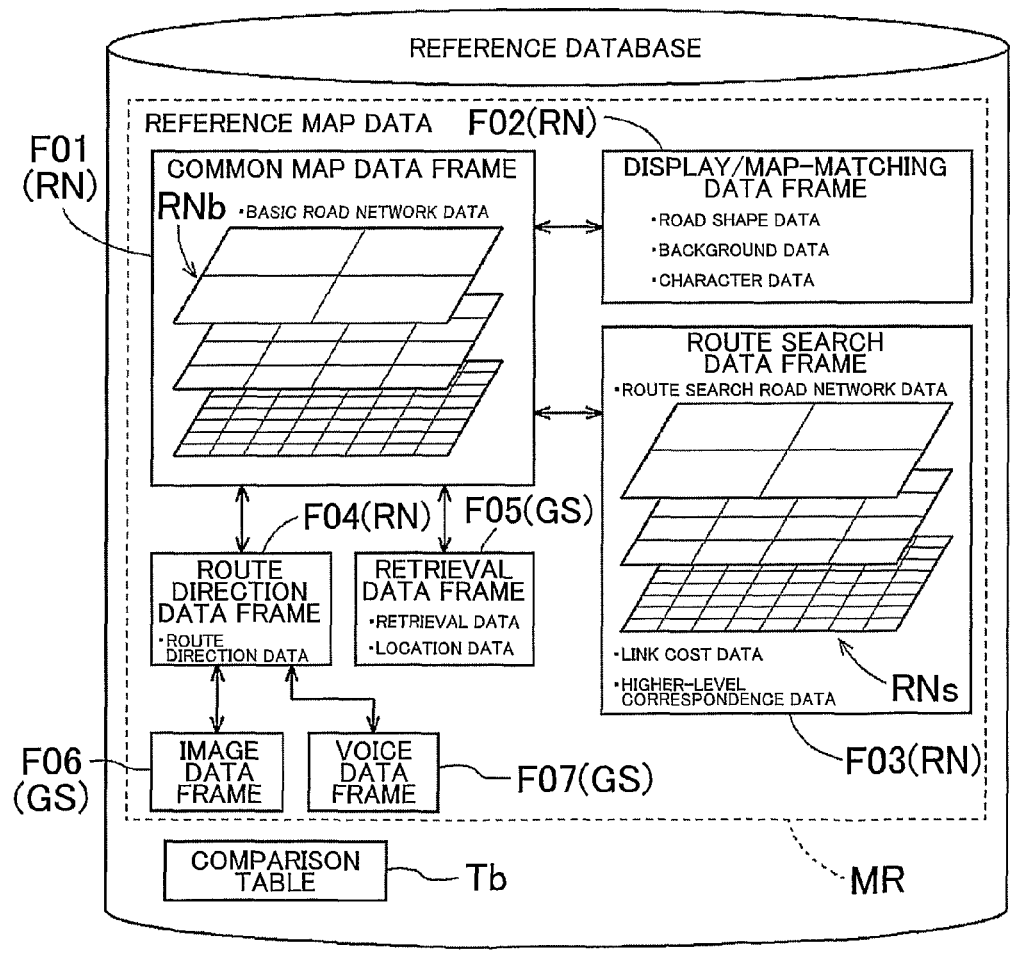
FIG. 3 is an explanatory diagram showing a specific example of a configuration of reference map data stored in a reference database.

The reference database 19 is a database storing the reference map data MR in a reference data format which is referred to by each application program AP1 to AP5 in order to achieve the navigation function of the navigation device 1. FIG. 3 is an explanatory diagram showing a specific example of a configuration of the reference map data MR stored in the reference database 19. As shown in the drawing, in this embodiment, the reference map data MR includes a common map data frame F01 commonly referred to by the plurality of application programs AP1 to AP5, a display/map-matching data frame F02 referred to by the display program AP1 and the map-matching program AP2, a route search data frame F03 referred to by the route search program AP3, a route direction data frame F04 referred to by the route direction program AP4, and a retrieval data frame F05 referred to by the retrieval program AP5. The reference map data MR includes an image data frame F06 and a voice data frame F07 respectively storing image data and voice data used for a route direction by the route direction program AP4. Since the display program AP1 and the map-matching program AP2 correspond to the "first program" of the present invention as described above, the display/map-matching data frame F02 corresponds to a "first map data frame" of the present invention. Further, since the route search program AP3 corresponds to the "second program" of the present invention, the route search data frame F03 corresponds to a "second map data frame" of the present invention.

Figure 4:
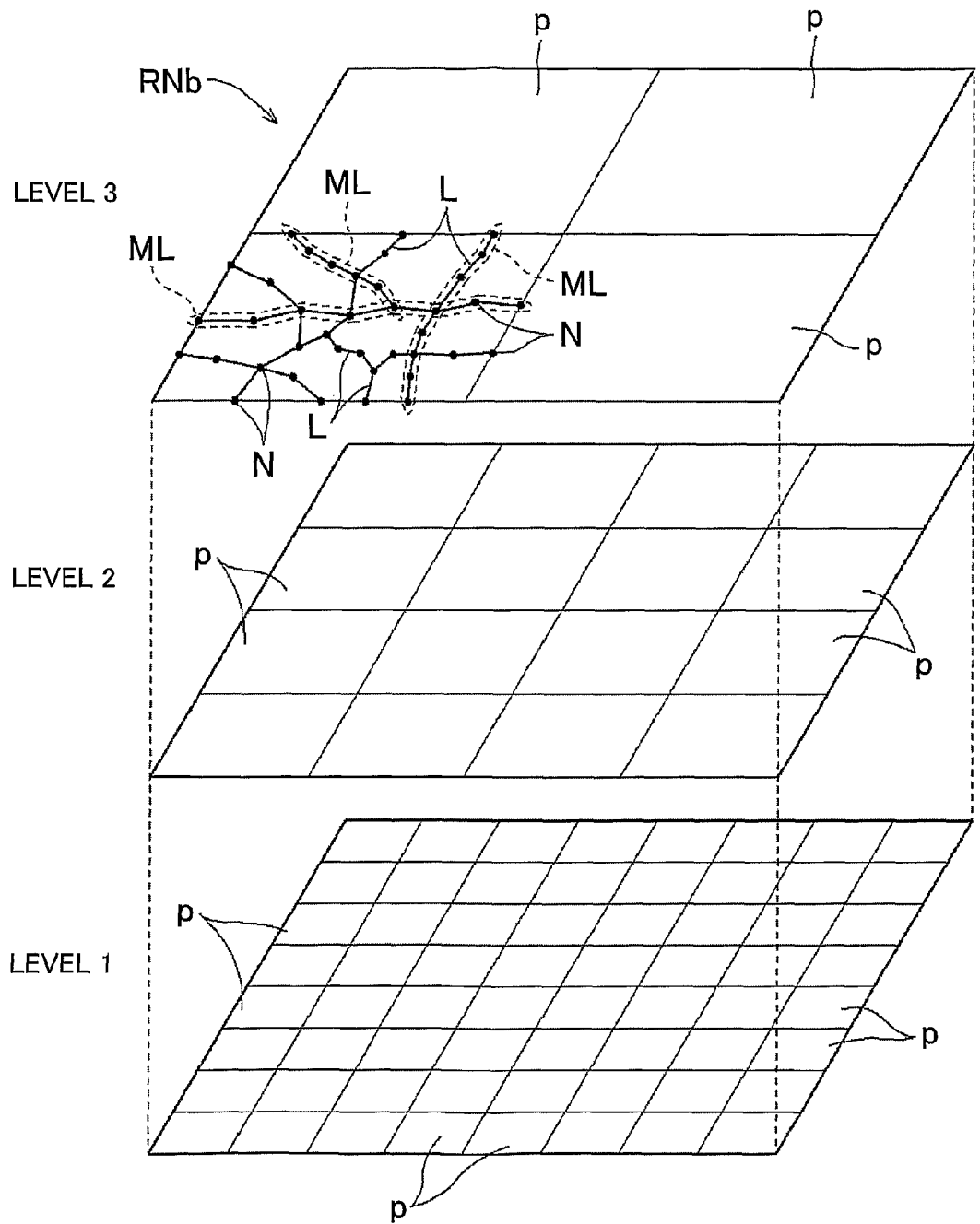
FIG. 4 is an explanatory diagram showing a configuration of basic road network data.

Each data frame F01 to F07 of the reference map data MR stores data referred to by each application program AP1 to AP5. FIG. 3 shows an example of the content of information stored in each data frame F01 to F07. In this example, the common map data frame F01 stores basic road network data RNb. FIG. 4 is an explanatory diagram showing a configuration of the basic road network data RNb. The basic road network data RNb is formed of basic data for forming a road network, and specifically formed of basic data such as a coordinate relating to a link L and a node N forming a road network. The link L and node N form a link line (multilink) ML by a plurality of continuous links L having a common attribute and the node N positioned at the end portion of each link L. As the common attribute which defines each link line ML, a road name, road type, and the like which indicate the names of roads in the real world such as, for example, National Route 1 and Meishin Expressway, are used. The plurality of links L having the same attribute are grouped together within one compartment p in the order of connection as long as possible to form one link line ML.

The basic road network data RNb is divided into a plurality of levels (hierarchies) according to the degree of detail of the stored road network information. In this example, the basic road network data RNb has three layers of level 1, level 2, and level 3 in the order from lower to higher. Lower levels store more detailed road network data. Specifically, each level stores, for example, data relating to the link L and the node N corresponding to a road of the following road type as the type of real roads corresponding to the road network. That is, level 1 stores data corresponding to a) expressways and toll roads, b) national roads, c) prefectural roads, d) main regional roads, and e) general roads. Level 2 excludes information of e) general roads, and stores data corresponding to a) expressways and toll roads, b) national roads, c) prefectural roads, and d) main regional roads. Level 3 further excludes information of c) prefectural roads, and d) main regional roads, and stores data corresponding to a) expressways and toll roads and b) national roads.

The basic road network data RNb is segmented into a plurality of compartments p having a range according to each level. Higher levels are set with compartments p corresponding to wider areas. Therefore, as shown in FIG. 4, one compartment p of a higher level includes an area corresponding to a plurality of compartments p of a lower level. The basic road network data RNb is formed of data for each of the plurality of compartments p on each level. Each compartment p is assigned with a unique compartment ID, which enables each compartment p on each level to be identified. Hereinafter, each of the plurality of compartments p is simply referred to as "compartment p."

The display/map-matching data frame F02 stores road shape data, background data, character data, and the like associated with the basic road network data RNb in the common map data frame F01. The road shape data is formed of data relating to a shape interpolation point which is a point on the link L for defining the shape of the link L of the road network, the road width, and the like. The road shape data is data used for both the map display by the display program AP1 and the map matching by the map-matching program AP2, and the background data is data of the shape, color, and the like for displaying various features other than roads such as a facility, river, and railroad used in the map display. The character data is data of characters for displaying the address, road name, facility name, and the like on a map.

The route search data frame F03 stores route search road network data RNs, link cost data, higher-level correspondence data, and the like associated with the basic road network data RNb in the common map data frame F01. The route search road network data RNs is data relating to the link L and the node N associated with the basic road network data RNb, and is formed of data required by the route search program AP3. Examples of such data include data of the number of links L connected to the node N, the number of traffic regulations or pieces of the link cost data, the relation between the link L and the link cost data, and the like. In the same manner as the basic road network data RNb, the route search road network data RNs is divided into a plurality of levels (hierarchies) according to the degree of detail of information of the stored road network, and is segmented into a plurality of compartments p having a range according to each level. The link cost data is data relating to the traffic cost for passing through the link such as the link length or the average travel time. The higher-level correspondence data is data representing the correspondence relation of each node N and link L between the higher level and the lower level.

The route direction data frame F04 stores route direction data associated with the basic road network data RNb in the common map data frame F01. The route direction data is formed of data showing the storage location of an intersection name, road name, or the like, data showing the storage location of the image data in the image data frame F06 or the voice data in the voice data frame F07, data of the guidance point and the content of guidance at the guidance point, and the like used for the route direction by the route direction program AP4.

The retrieval data frame F05 stores retrieval data, location data, and the like. The retrieval data is formed of data for location retrieval such as a Japanese syllabary retrieval, an address retrieval, and a telephone number retrieval. The location data is formed of data representing detailed information such as the name and the coordinate of a location of a retrievable facility, place, or the like associated with the retrieval data.

As described above, the basic road network data RNb stored in the common map data frame F01 and data stored in the display/map-matching data frame F02, the route search data frame F03, and the route direction data frame F04 among the data forming the reference map data MR relate to the road network with the basic road network data RNb playing a central role. Thus, these pieces of data are hereinafter generically referred to as "road network data RN." Since the retrieval data, location data, and the like stored in the retrieval data frame F05, the image data stored in the image data frame F06, and the voice data stored in the voice data frame F07 are data for guidance retrieval, these pieces of data are generically referred to as "guidance retrieval data GS."

Figure 5:
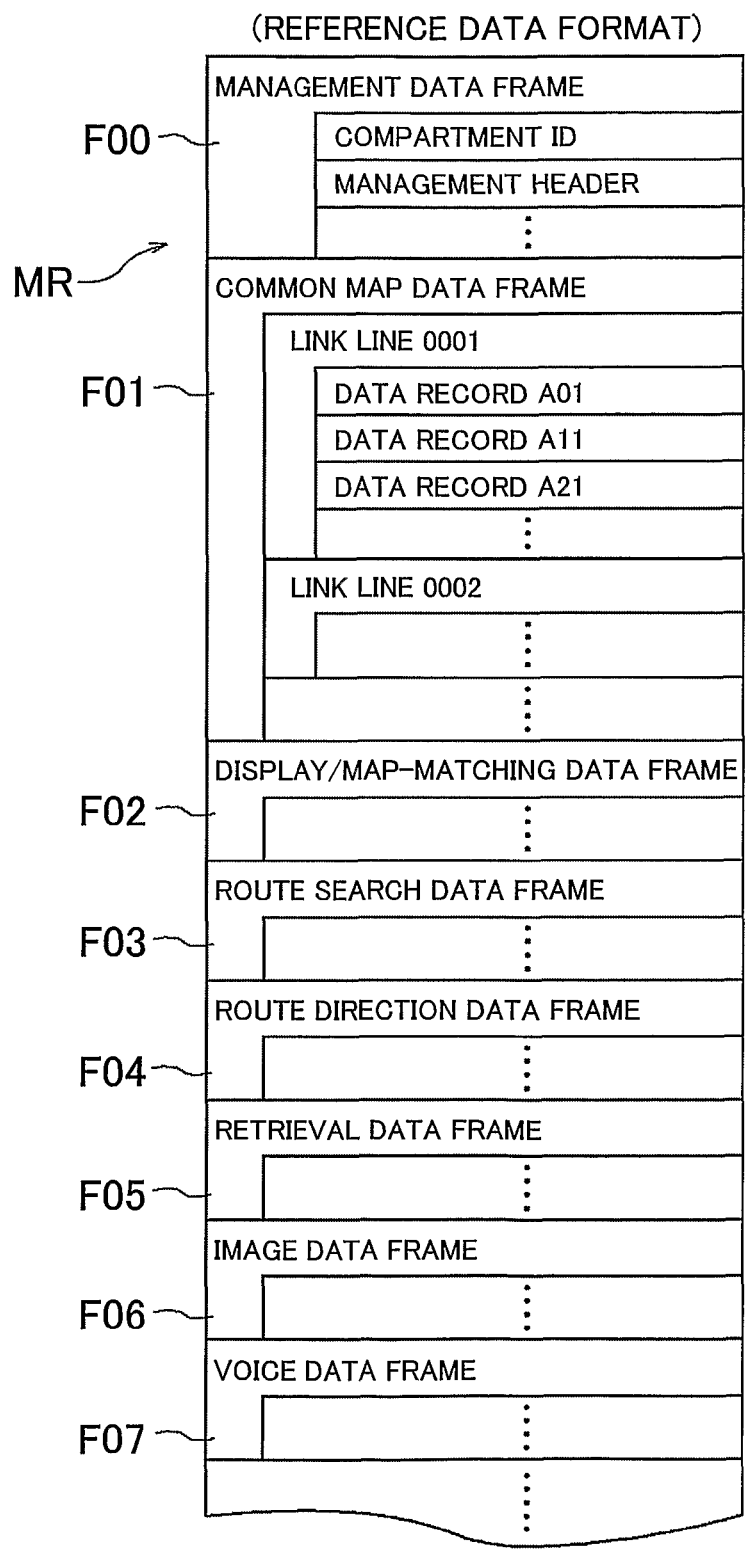
FIG. 5 is a diagram showing a specific example of a data alignment of reference map data in a reference data format.

FIG. 5 is a diagram showing a specific example of a data alignment of the reference map data MR in the reference data format as shown in FIG. 3. As shown in the thawing, the reference map data MR has a management data frame F00 provided at the beginning of the data. The management data frame F00 stores data relating to a compartment ID, a management header, and the like. The compartment ID is a code unique to each compartment p for identifying the plurality of compartments p set for the basic road network data RNb and the like of the reference map data MR. The management header is formed of management data such as the storage location and the like of each piece of data forming the reference map data MR. The common map data frame F01, the display/map-matching data frame F02, the route search data frame F03, the route direction data frame F04, the retrieval data frame F05, the image data frame F06, and the voice data frame F07 are aligned in order, following the management data frame F00. In this manner, the reference map data MR is stored in the reference database 19 as data segmented for each of the plurality of compartments p in this embodiment.

Data records stored in the common map data frame F01 are aligned in the order of the road network connection. Specifically, each data record of the common map data frame F01 is aligned for each link line ML (see FIG. 4) forming the basic road network data RNb according to the order in which the link L and the node N in the link line ML are connected. For example, as shown in FIG. 5, all data records A01, A11, A21, . . . relating to the link L and the node N forming a link line 0001 are aligned in a data frame of the link line 0001, followed by a data frame of another link line such as a link line 0002. Although omitted in the drawing, data records stored in each of the display/map-matching data frame F02, the route search data frame F03, and the route direction data frame F04 are associated with the data records in the common map data frame F01, and aligned in the order of the road network connection in the same manner as those of the common map data frame F01. Thus, the data records in each data frame F01 to F04 forming the road network data RN are arranged according to the order of the data readout when performing a process of each application program AP1 to AP4, whereby the readout speed when referring to each application program AP1 to AP4 can be increased. Data records in each data frame F05 to F07 forming the guidance retrieval data GS are not aligned in the order of the road network connection, but are aligned to be suitable for the retrieval process by the retrieval program AP5, or the readout process of the image data or voice data by the route direction program AP4.

Figure 6:
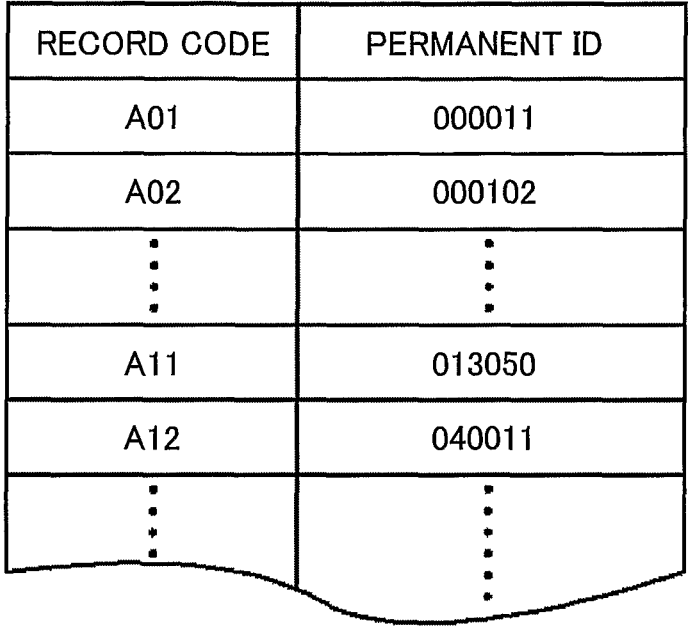
FIG. 6 is a diagram showing a specific example of a comparison table.

As shown in FIG. 3, the reference database 19 stores a comparison table Tb of a record code and a permanent ID of each data record forming the reference map data MR. The permanent ID is an ID commonly used for an update map data ML, and is an identification code unique to each data record forming the reference map data MR and the update map data ML. FIG. 6 is a diagram showing a specific example of the comparison table Tb. As shown in the drawing, the record codes of each data record forming the reference map data MR are shown as A01, A02, ..., A11, A12, ..., and the like as an example. The permanent ID stored in the update data file Df (see FIG. 8) described below and each data record forming the reference map data MR can be related by referring to the comparison table Tb. Accordingly, the data record associated with the permanent ID stored in the update data file Df and the data record forming the guidance retrieval data GS of the reference map data MR can be related to update the guidance retrieval data GS based on the update data file Df.

Returning to FIG. 1, the current position detection unit 21 is a unit for detecting the current position of the navigation device 1. Therefore, although not shown in the drawing, the current position detection unit 21 includes, for example, a GPS receiver, a direction sensor, a distance sensor, and the like. Based on information acquired therefrom, the current position detection unit 21 acquires information such as the coordinate showing the present position, traveling direction, and the like and outputs the information to the navigation computing unit 20. The display operation section 23 includes a display screen such as a liquid crystal display device, a touch panel or operation switch interconnected with the display screen, and the like. The voice output section 24 includes a speaker, an amplifier, and the like. The display operation section 23 and the voice output section 24 are connected to the navigation computing unit 20 via the driver 22, and performs a display output, voice output, and the like for current position display, route calculation between two locations, course guidance, destination retrieval, and the like according to the operation of the navigation computing unit 20. The display operation section 23 accepts an operation input by a user and outputs the content of the operation input to the navigation computing unit 20.

2. Configuration for Achieving Map-Update Function of Navigation Device

The navigation device 1 has a configuration for achieving an update function of the reference map data MR stored in the reference database 19 in addition to the configuration for achieving the navigation function described above. As such configuration, the navigation device 1 includes a communication unit 11, a media reproduction unit 12, an update data file acceptance unit 13, a data sort unit 14, an update map data update unit 15, a local save database 16, a conversion unit 17, and a reference map data update unit 18 in this embodiment, as shown in FIG. 1. The navigation device 1 updates the update map data ML in the local save database 16 based on the update data file Df provided from the update data delivery server 4, and converts the updated update map data ML to the reference map data MR in the reference data format to perform an update of the reference database 19. Note that only the portion of the update map data ML relating to the road network data RN of the data forming the reference map data MR is the data for update in this embodiment. Thus, the guidance retrieval data GS directly performs the update of the reference map data MR of the reference database 19 based on the update data file Df, without involving the update map data ML. Each of these configurations is described below in detail.

Figure 7:
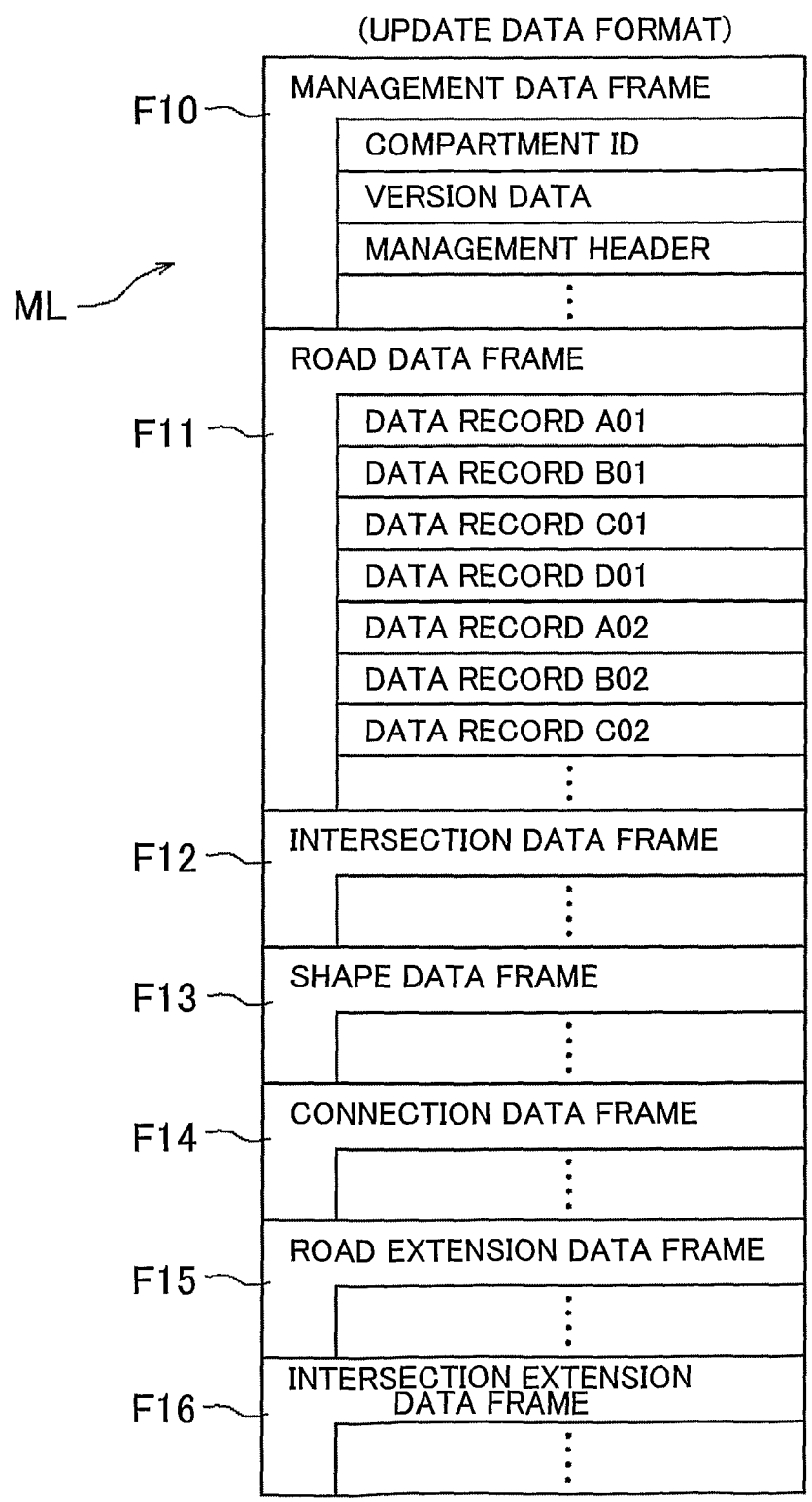
FIG. 7 is a diagram showing a specific example of a data alignment of update map data in an update data format.

First, the local save database 16 and the update map data ML are described. The local save database 16 is a database stored in the update map data ML. The update map data ML is map data capable of a differential update by the update data file Df. In this example, the map data is only for the portion relating to the road network data RN of the data forming the reference map data MR. In order to facilitate the differential update, the update map data ML is data in an update data format different from the reference data format of the reference map data MR. FIG. 7 is a diagram showing a specific example of the data alignment of the update map data ML in the update data format. As shown in the drawing, the update map data ML has a management data frame F10 provided at the beginning of the data. The management data frame F10 stores data relating to the compartment ID, version data, the management header, and the like. The compartment ID is a code unique to each compartment p for identifying a plurality of compartments p set for the update map data ML, and is an identification code common with the compartment ID representing each compartment p for the reference map data MR. The version data is data showing the version of update by the update data file Df. The management header is formed of management data such as the storage location and the like of each piece of data forming the update map data ML. A road data frame F11, an intersection data frame F12, a shape data frame F13, a connection data frame F14, a road extension data frame F15, and an intersection extension data frame F16 are arranged in order as data frames for each data type, following the management data frame F10. The update map data ML is stored in the local save database 16 as data segmented for each of the plurality of compartments p in the same manner as the reference map data MR.

The road data frame F11 stores various data records relating to the links representing roads, e.g., data records representing information of nodes on both ends of the link, the road width, the number of lanes, the road type, and the like. The intersection data frame F12 stores various data records relating to a node representing an intersection, e.g., data records representing information of the coordinate of each node, the attribute of an intersection representing whether or not a signal, signpost, and the like is present, and the like. The shape data frame F13 stores data records representing information of the coordinate of the shape interpolation point which defines the shape of a link representing a road and the like. The connection data frame F14 stores data records representing information on which road (link) is connected to the node representing an intersection, and information such as the necessity of guidance according to the traveling direction at an intersection, and the presence or absence of a regulation. The road extension data frame F15 stores data records representing the road name and the information for displaying the traffic situation, and the like. The intersection extension data frame F16 stores data records representing the intersection name and the information for guidance of an intersection, and the like.

As described above, each data frame F11 to F16 divided for each data type of the update map data ML stores at least one of: a group of one or more common map data records A01, A02, . . . stored in the common map data frame F01 of the reference map data MR; a group of one or more display/map-matching data records B01, B02, . . . stored in the display/map-matching data frame F02; and a group of one or more route search data records C01, C02, . . . stored in the route search data frame F03 after a conversion by the conversion unit 17 described below according to the data type of each data frame P11 to F16. In this embodiment, the display/map-matching data records B01, B02, . . . correspond to "first map data records" of the present invention, and the route search data records C01, C02, . . . correspond to "second map data records" of the present invention. In this embodiment, each data record of the update map data ML can be identified as the common map data record, the display/map-matching data record, or the route search data record based on the record code (identification code) A01, B01, C01, . . . .

Although not shown in FIG. 1, the local save database 16 stores a comparison table Tb, as shown in FIG. 6, of a record code and a permanent ID of each data record forming the update map data ML in the same manner as the reference database 19. The permanent ID stored in the update data file Df (see FIG. 8) described below and each data record forming the update map data ML can be related by referring to the comparison table Tb. Accordingly, the data record associated with the permanent ID stored in the update data file Df and the data record forming the update map data ML can be related to update the update map data ML based on the update data file Df.

The update data file acceptance unit 13 is a unit which accepts the update data file Df provided from the update data delivery server 4. The update data file Df is accepted via the communication unit 11 or the media reproduction unit 12. The communication unit 11 is capable of receiving the update data file Df through radio transmission from a radio base station 5. As a method of radio communication, a known communication network such as, for example, a mobile phone network or wireless local area network (LAN) may be used. The communication unit 11 is capable of performing communication with an update terminal 7 of a user, dealer of the navigation device 1, or the like, and receiving the update data file Df transmitted to the update terminal 7 via a communication network 6 such as the Internet. A personal computer or the like may be used as the update terminal 7, and various known wire or wireless communication methods may be used as the method of communication between the communication unit 11 and the update terminal 7. The media reproduction unit 12 is capable of reproducing a recording medium produced by the update data delivery server 4, and reading out the update data file Df recorded thereon. The update data file acceptance unit 13 accepts the update data file Df only in versions newer than the version of the update map data ML stored in the local save database 16 when receiving the update data file Df from the update data delivery server 4 via the communication unit 11 or when the media reproduction unit 12 reads out the update data file Df from the recording medium.

The update data file Df is a file filing update data representing the content of the update to be performed with respect to the content of the update map data ML stored in the local save database 16 of the navigation device 1 in accordance with the situations of actual roads, facilities, and the like. As described below, the update data file Df is generated by the update data generation server 3 based on a comparison local save database 33 storing the update map data ML having the same content as that of the update map data ML in the local save database 16 of the navigation device 1, and new data.

Figure 8:
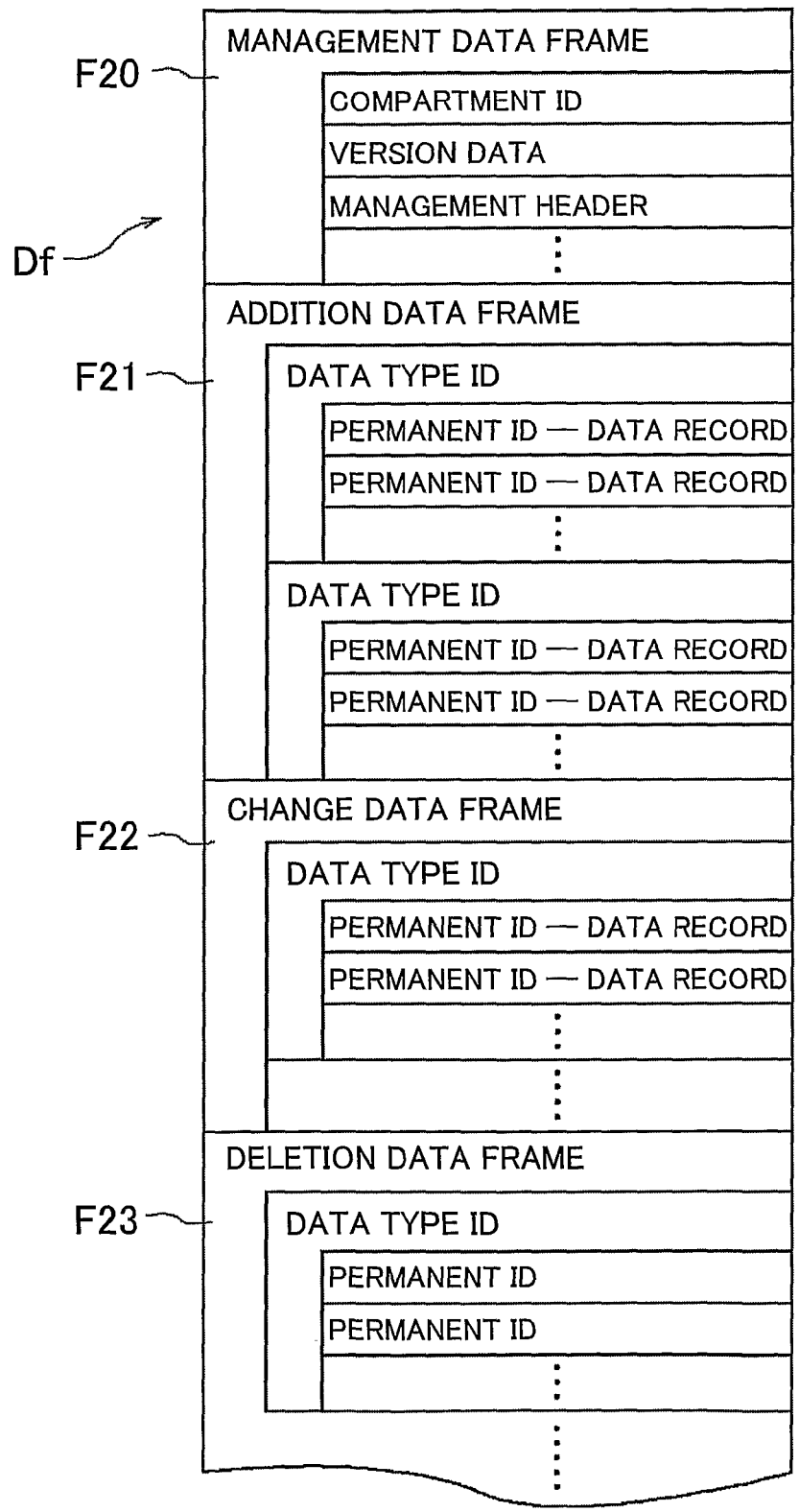
FIG. 8 is a diagram showing a specific example of a data alignment of an update data file.

FIG. 8 is a diagram showing a specific example of a data alignment of the update data file Df. As shown in the drawing, the update data file Df has a management data frame F20 provided at the beginning of the data. The management data frame F20 stores data relating to the compartment ID, the version data, the management header, and the like. The compartment ID represents compartments p of the update map data ML to be updated, and is an identification code common with the compartment ID representing each compartment p of the update map data ML and the reference map data MR. The version data is data showing the version after the update by the update data file Df. The management header is formed of management data such as the storage location and the like of each piece of data forming the update data file Df. An addition data frame F21, a change data frame F22, and a deletion data frame F23 are aligned in order, following the management data frame F20. In each of these data frames F21 to F23, data records representing the content of update are divided and stored for each form of the update. In the update data file Df, the plurality of data records divided for each form of update are aligned in order according to the data type. Therefore, each data frame F21 to F23 stores a data frame assigned with a data type ID for each data type. In the data frame of each data type, the data records representing the content of update are stored. Each data record is stored in a state associated with a unique permanent ID. Each of these data records updates the data record in the update map data ML. Thus, the update data file Df stores one or more of a common data record for updating the common map data records A01, A02, . . . (see FIG. 7) of the update map data ML, a display/map-matching update data record for updating the display/map-matching data records B01, B02, . . . (see FIG. 7) of the update map data ML, and a route search update data record for updating the route search data records C01, C02 . . . of the update map data ML. Thus, the update data file Df has pieces of data in the data frames F21 to F23 for each form of update aligned in the update data format divided for each data type in the same manner as the update map data ML in order to update the update map data ML. Note that since a data record after the update is unnecessary in the case where the form of update is "deletion," only the permanent IDs of data to be deleted are stored in the deletion data frame F23. The permanent ID is an ID commonly used for the reference map data MR and the update map data ML, and is associated with each data record of the reference map data MR and the update map data ML based on the comparison table Tb shown in FIG. 6.

The data types of the data frame for each data type in the data frames F21 to F23 for each form of update of the update data file Df, i.e., the data types shown by the data type ID, are "intersection data," "connection data," "road data," "shape data," "road extension data," "intersection extension data," "image data," "voice data," and "retrieval data." Of these, the "intersection data," "connection data," "road data," "shape data," "road extension data," and "intersection extension data" correspond to the data frames for each data type of the update map data ML, and thus, correspond to the road network data RN of the reference map data MR. The "image data," "voice data," and "retrieval data" correspond to the guidance retrieval data GS of the reference map data MR. Thus, the data records in the update data file Df are divided into data records for update corresponding to the road network data RN for updating the update map data ML and data records for update corresponding to the guidance retrieval data GS for directly updating the reference map data MR, based on the data type shown by the data type ID assigned to the data frame of the data frames F21 to F23 for each form of update.

Returning to FIG. 1, the data sort unit 14 is a unit which sorts the data records in the update data file Df accepted by the update data file acceptance unit 13 into data records for update corresponding to the road network data RN and data records for update corresponding to the guidance retrieval data GS. As described above, only the portion of the update map data ML in the local save database 16 relating to the road network data RN of the data forming the reference map data MR is the map data for update in this embodiment. The data sort unit 14 sends the data record for update corresponding to the road network data RN sorted from the update data file Df to the update map data update unit 15. The data sort unit 14 also sends the data record for update corresponding to the guidance retrieval data GS sorted from the update data file Df to the reference map data update unit 18.

The update map data update unit 15 is a unit which updates the update map data ML in the local save database 16 based on the data record for update sorted by the data sort unit 14 and corresponding to the road network data RN included in the update data file Df. As described above, the update data file Df and the update map data ML store data of the compartment IDs in the management data frames F10 and F20 (see FIG. 7 and FIG. 8). Therefore, the update map data update unit 15 performs the update for each compartment of the update map data ML using the update data file Df of which the compartment ID data matches. When updating the update map data ML, the update map data update unit 15 performs the update of the data records in the data frames F11 to F16 of the update map data ML corresponding to the data type represented by the data type ID of the data frames storing each data record, according to the form of update (addition, change, deletion) of the data frames F21 to F23 storing each data record of the update data file Df.

Regarding the data record stored in the addition data frame F21, the update map data update unit 15 adds the data record to the data frame (either of F11 to F16) of the data type corresponding to the data record of the update map data ML, and updates the management header of the management data frame F10 accordingly. The update map data update unit 15 also updates the comparison table Tb, and adds information of the record code and the permanent ID of the added data record. Regarding the data record stored in the change data frame F22, the update map data update unit 15 first acquires information of the record code of the corresponding data record in the update map data ML from the permanent ID associated with the data record of the update data file Df, based on the comparison table Tb as shown in FIG. 6. Then, the update map data update unit 15 refers to the management header of the management data frame F10 to acquire information of the storage location of the corresponding data record in the update map data ML, and rewrites the corresponding data record based on the data record of the update data file Df. Regarding the permanent ID stored in the deletion data frame F23, the update map data update unit 15 first acquires information of the record code of the data record in the update map data ML corresponding to the permanent ID, based on the comparison table Tb as shown in FIG. 6. Then, the update map data update unit 15 refers to the management header of the management data frame F10 to acquire information of the storage location of the corresponding data record in the update map data ML, deletes the corresponding data record, and updates the management header of the management data frame F10 accordingly. The update map data update unit 15 also updates the comparison table Tb, and deletes information of the record code and the permanent ID of the deleted data record.

In the case where the update map data ML in the local save database 16 is updated by the update data file Df, the update map data update unit 15 updates the version data (see FIG. 7) in the management data frame F10 of the updated update map data ML of the compartment p to the same version as that of the version data (see FIG. 8) in the management data frame F20 of the updated update data file Df.

The conversion unit 17 is a unit which converts the update map data ML in the update data format stored in the local save database 16 to the reference map data MR in the reference data format. That is, the conversion unit 17 performs a process of converting data in the update data format in which each data record is aligned in the order of the data type as shown in FIG. 7 to data in the reference data format in which each data record is aligned in the order of the road network connection as shown in FIG. 5. Specifically, the conversion unit 17 performs a process of converting the update map data ML to the reference map data MR by sorting the plurality of data records included in the update map data ML and generating the common map data frame F01, the display/map-matching data frame F02, and the route search data frame F03 of the reference map data MR.

Figure 9:
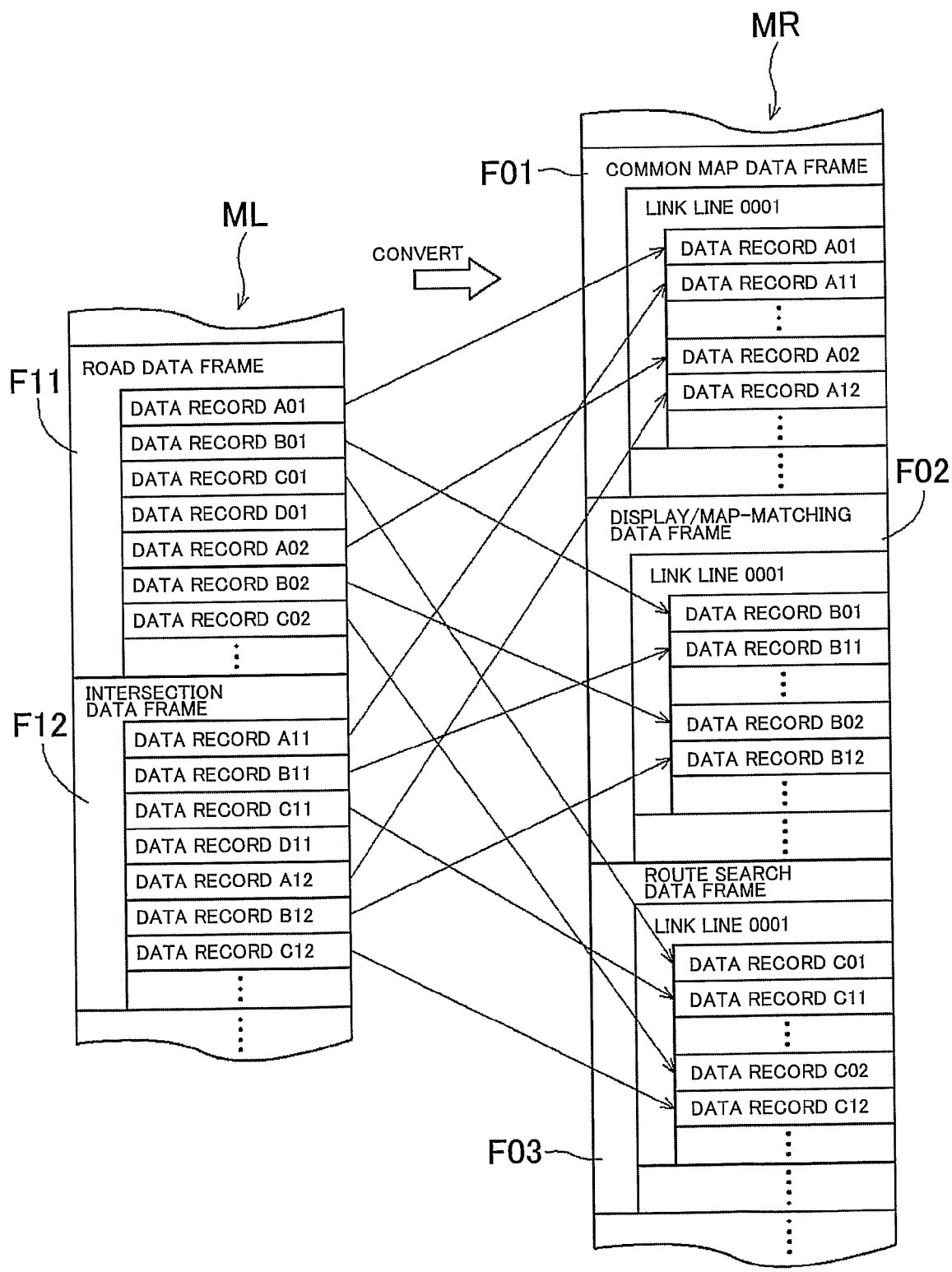
FIG. 9 is an explanatory diagram showing a specific example of a conversion process by a conversion unit.

FIG. 9 is an explanatory diagram showing a specific example of such conversion process by the conversion unit 17. As shown in the drawing, the conversion unit 17 sorts the data records to be stored in each of the common map data frame F01, the display/map-matching data frame F02, the route search data frame F03, and the route direction data frame F04 of the reference map data MR out of the data records stored in each data frame F11 to F16 of the update map data ML, and stores the sorted data record in each data frame F01 to F04. The conversion unit 17 performs the sort of the storage destination (data frames F01 to F04) based on the record codes (identification codes) A01, B01, C01, . . . of each data record of each data frame F11 to F16 of the update map data ML. Then, the conversion unit 17 aligns each sorted data record in the order of the road network connection, and stores the data records in each data frame F01 to F04 of the reference map data MR. The conversion unit 17 also performs a format change and the like of each data record, when storing the data records in each data frame F01 to F04 of the reference map data MR. In this manner, the conversion unit 17 is capable of converting one piece of the update map data ML in the local save database 16, and generating the reference map data MR having the plurality of data frames F01 to F04 corresponding to the plurality of application programs AP01 to AP04 in this embodiment. In the reference database 19, the reference map data MR is stored as data segmented for each of the plurality of compartments p. Therefore, the conversion unit 17 performs the process of converting the update map data ML to the reference map data MR for each compartment p.

The reference map data update unit 18 is a unit which updates the reference map data MR stored in the reference database 19. Regarding the common map data frame F01, the display/map-matching data frame F02, the route search data frame F03, and the route direction data frame F04 relating to the road network data RN of the reference map data MR, the reference map data MR for each compartment p in the reference database 19 is replaced and updated with the reference map data MR for each compartment p after the conversion by the conversion unit 17 in this embodiment. Regarding the retrieval data frame F05, the image data frame F06, and the voice data frame F07 relating to the guidance retrieval data GS of the reference map data MR, the reference map data update unit 18 directly updates the reference database 19 based on the data record for update, sorted by the data sort unit 14 and corresponding to the guidance retrieval data GS included in the update data file Df. Specifically, the reference map data update unit 18 first acquires information of the record code of the corresponding data record from the permanent ID of the data record for update corresponding to the guidance retrieval data GS stored in the update data file Df, based on the comparison table Tb shown in FIG. 6. Then, the reference map data update unit 18 extracts the corresponding data record from the reference database 19, and performs the update by rewriting the data record to the data record for update stored in the update data file Df.

3. Configuration of Update Data Generation Server

The update data generation server 3 is a server device which generates the update data file Df, and performs a process of providing the update data file Df to the update data delivery server 4. As a configuration for implementing such process, the update data generation server 3 includes an input terminal 31 as a new data acceptance unit, a data type determination unit 32, the comparison local save database 33, a new local save database 34, a new update map data generation unit 35, and an update data file generation unit 36.

The input terminal 31 is a terminal for accepting an input of new data. The input new data is specific data having a content which should be newly added, changed, deleted, or the like with respect to the reference map data MR stored in the reference database 19 of the navigation device 1. For example, in the case where a new road is constructed in the real world, various data relating to the intersection (node), road (link), and the like forming the road network data RN of the portion relating to the road, or various data of the image, voice, retrieval, and the like forming the guidance retrieval data GS required in conjunction with the new construction of the road is input from the input terminal 31 as the new data. In the case where the road is removed completely, for example, information designating various data forming the road network data RN or various data forming the guidance retrieval data GS of the portion made unnecessary by the removal of the road is input. As such information designating various data, the permanent ID, identification code, or the like may be used, for example. As the input terminal 31, a personal computer or the like including a keyboard, mouse, monitor, and the like may specifically be used. In this embodiment, the input terminal 31 forms the "new data acceptance unit" of the present invention.

The data type determination unit 32 is a unit which determines whether the new data input from the input terminal 31 is data relating to the road network data RN or data relating to the guidance retrieval data GS, and sorts the determined pieces of data. As described below, the comparison local save database 33 is a database storing the update map data ML having the same content as that of the update map data ML stored in the local save database 16 of the navigation device 1, and the new local save database 34 is a database in which the content of the comparison local save database 33 is updated by the new data. As described above, only the portion of the update map data ML relating to the road network data RN of the data forming the reference map data MR is the data for update in this embodiment. The data type determination unit 32 sends the data relating to the road network data RN sorted from the new data to the new update map data generation unit 35. The data type determination unit 32 sends the data relating to the guidance retrieval data GS sorted from the new data to the update data file generation unit 36.

The comparison local save database 33 is a database storing the update map data ML having the same content as that of the update map data ML stored in the local save database 16 of the navigation device 1. That is, the comparison local save database 33 stores the update map data ML in the update data format, as shown in FIG. 7, segmented for each of the plurality of compartments p in the same manner as the local save database 16. The comparison local save database 33 stores a comparison table Tb, as shown in FIG. 6, of the record code and the permanent ID of each data record forming the update map data ML in the same manner as the local save database 16. The content of the update map data ML in the comparison local save database 33 is updated to match the content of new update map data MLn in the new local save database 34 after the update data file Df is generated, whereby the same content as that of the update map data ML in the local save database 16 of the navigation device 1 updated by the update data file Df is constantly maintained. Note that the new local save database 34 stores the update map data ML only for the compartment p updated by the new data, as described below. Therefore, the update of the update map data ML stored in the comparison local save database 33 is performed only for the update map data ML of the compartment p stored in the new local save database 34. The update map data ML in the comparison local save database 33 is updated such that the version data (see FIG. 7) in the management data frame F10 of the updated update map data ML of the compartment p becomes the same version as that of the version data (see FIG. 8) in the management data frame F20 of the generated update data file Df.

The new local save database 34 is a database which has the same update data format as that of the update map data ML in the comparison local save database 33, and which stores the new update map data MLn having the content updated by the content of the new data input from the input terminal 31. That is, the new local save database 34 stores the new update map data MLn in the update data format, as shown in FIG. 7, and a comparison table Tb, as shown in FIG. 6, of the record code and the permanent ID of each data record forming the new update map data MLn in the same manner as the comparison local save database 33. Note that the new update map data generation unit 35 updates the update map data ML for each compartment p, and stores the updated update map data. ML as the new update map data MLn in the new local save database 34. Thus, the new local save database 34 stores only the new update map data MLn for the updated compartment p. The content of the comparison table Tb differs from that of the comparison local save database 33 for the portion updated by the content of the new data.

The new update map data generation unit 35 is a unit which generates the new update map data MLn stored in the new local save database 34 based on the update map data ML in the comparison local save database 33 and the new data input from the input terminal 31. Specifically, the new update map data generation unit 35 converts the data input from the input terminal 31 and relating to the portion of the road network data RN to be added, changed, deleted, or the like to the same update data format as the update map data ML. The new update map data generation unit 35 reads out the update map data ML of the compartment p to be updated from the comparison local save database 33, and updates the update map data ML by performing addition, change, deletion, or the like using the converted data. Then, the new update map data generation unit 35 stores the updated new update map data MLn of the compartment p in the new local save database 34. The new update map data generation unit 35 correspondingly updates the content of the comparison table Tb (see FIG. 6) by performing addition, change, deletion, or the like, and stores the updated comparison table Tb in the new local save database 34.

The update data file generation unit 36 is a unit which compares the update map data ML in the comparison local save database 33 and the new update map data MLn in the new local save database 34 to generate the update data file Df. As described above, the update map data ML in the comparison local save database 33 has the same content as that of the update map data ML in the local save database 16 of the navigation device 1. The new update map data MLn in the new local save database 34 has the same update data format as that of the comparison local save database 33 and has a content updated by the new data input from the input terminal 31. Therefore, the data relating to the road network data RN forming the content of the update data file Df can be acquired by comparing the contents of the update map data ML and the new update map data MLn in these two databases and extracting the difference thereof. The data relating to the guidance retrieval data GS sorted by the data type determination unit 32 is sent to the update data file generation unit 36. The update data file generation unit 36 files the data relating to the road network data RN extracted as the difference between the update map data ML and the new update map data MLn and the data relating to the guidance retrieval data GS sent from the data type determination unit 32 in a predetermined data format of the update data file Df to generate the update data file Df. Note that the update data file Df is generated for each compartment p in accordance with the updated new update map data MLn for the compartment p stored in the new local save database 34.

The specific content of the update data file Df is already described, and therefore is not described here in detail. The update data file generation unit 36 counts the number of times the update data file Df has been generated, stores the number of times in a version data save unit (not shown), and gives the update data file Df a serial number or the like corresponding to the number of generated update data file Df as a version. The given version is stored as the version data in the management data frame F20 of the update data file Df. Note that the number of times the update data file Df has been generated is counted for each compartment p in accordance with the compartment p of the update map data ML. The permanent ID associated with each data record is given based on the comparison table Tb (see FIG. 6) stored in the new local save database 34. The data type ID assigned to the data frame of each data type of the update data file Df is given based on a table (not shown) included in the update data file generation unit 36. The update data file Df generated by the update data file generation unit 36 is transmitted to the update data delivery server 4, and stored in the an update file database 41.

4. Configuration of Update Data Delivery Server

The update data delivery server 4 is a server device which performs a process for providing the update data file Df generated by the update data generation server 3 to the navigation device 1. As a configuration for implementing such process, the update data delivery server 4 includes the update file database 41, and a delivery unit 42 and a media production unit 43 as update data file output units 44 which output the update data file Df to be provided to the navigation device 1.

The update file database 41 is a database which stores the update data file Df generated by the update data generation server 3. In the update file database 41, all update data files Df that has been generated by the update data generation server 3 are stored. That is, the update file database 41 stores all of one or more versions of the update data file Df that has been generated for each compartment p of the update map data ML.

The delivery unit 42 is a unit for delivering the update data file Df to the navigation device 1. The delivery unit 42 is capable of delivering the update data file Df to the navigation device 1 via the radio base station 5 or via the communication network 6 and the update terminal 7. The media production unit 43 is capable of recording the update data file Df stored in the update file database 41 on a recording medium Me according to the instruction or the like from an operation unit (not shown) of the update data delivery server 4. The method of providing the update data file Df by the update data delivery server 4 is described below in detail using a flowchart.

5. Method of Generating Update Data File

Figure 10:
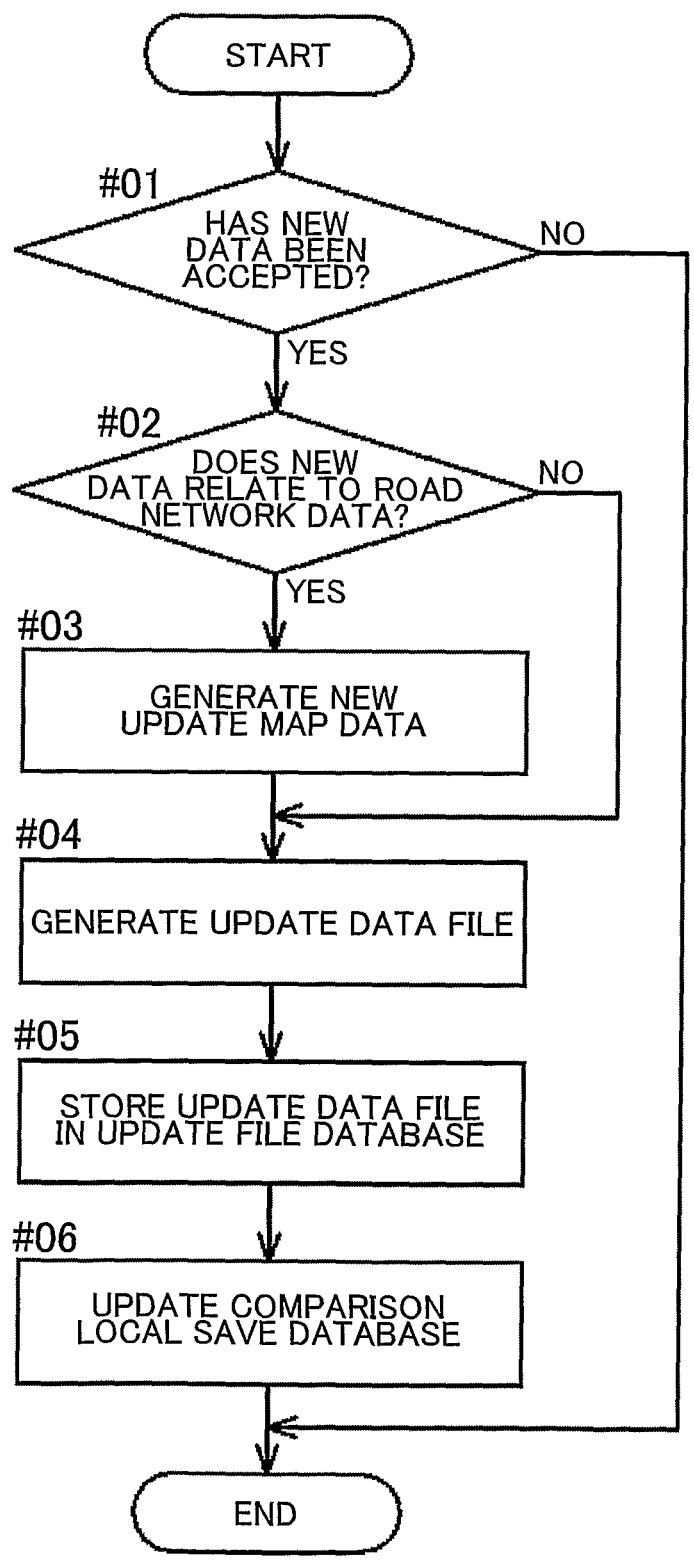
FIG. 10 is a flowchart of a method of generating the update data file.

Next, the method of generating the update data file Df by the update data generation server 3 is described based on the flowchart shown in FIG. 10. In the case where the input of the new data is accepted by the input terminal 31 (step #01: Yes), the data type determination unit 32 of the update data generation server 3 determines whether the new data is data relating to the road network data RN or data relating to the guidance retrieval data GS (step #02). The data relating to the road network data RN (step #02: Yes) is sent to the new update map data generation unit 35, and the new update map data generation unit 35 generates the new update map data MLn (step #03) to be stored in the new local save database 34. On the other hand, the process of the step #03 is not performed for the data relating to the guidance retrieval data GS (step #02: No). In the case where the new data includes both the data relating to the road network data RN and the data relating to the guidance retrieval data GS, the pieces of data are sorted to send the data relating to the road network data RN to the new update map data generation unit 35 and send the data relating to the guidance retrieval data GS to the update data file generation unit 36.

Next, the update data file generation unit 36 generates the update data file Df (step #04) based on the difference between the update map data ML in the comparison local save database 33 and the new update map data MLn in the new local save database 34. The generated update data file Df is transmitted to the update data delivery server 4 and stored in the update file database 41 (step #05). Then, the content of the update map data ML in the comparison local save database 33 is updated to match the new update map data MLn in the new local save database 34 (step #06). The process of generating the update data file Df by the update data generation server 3 is thus completed.

6. Method of Providing Update Data File

Figure 11:
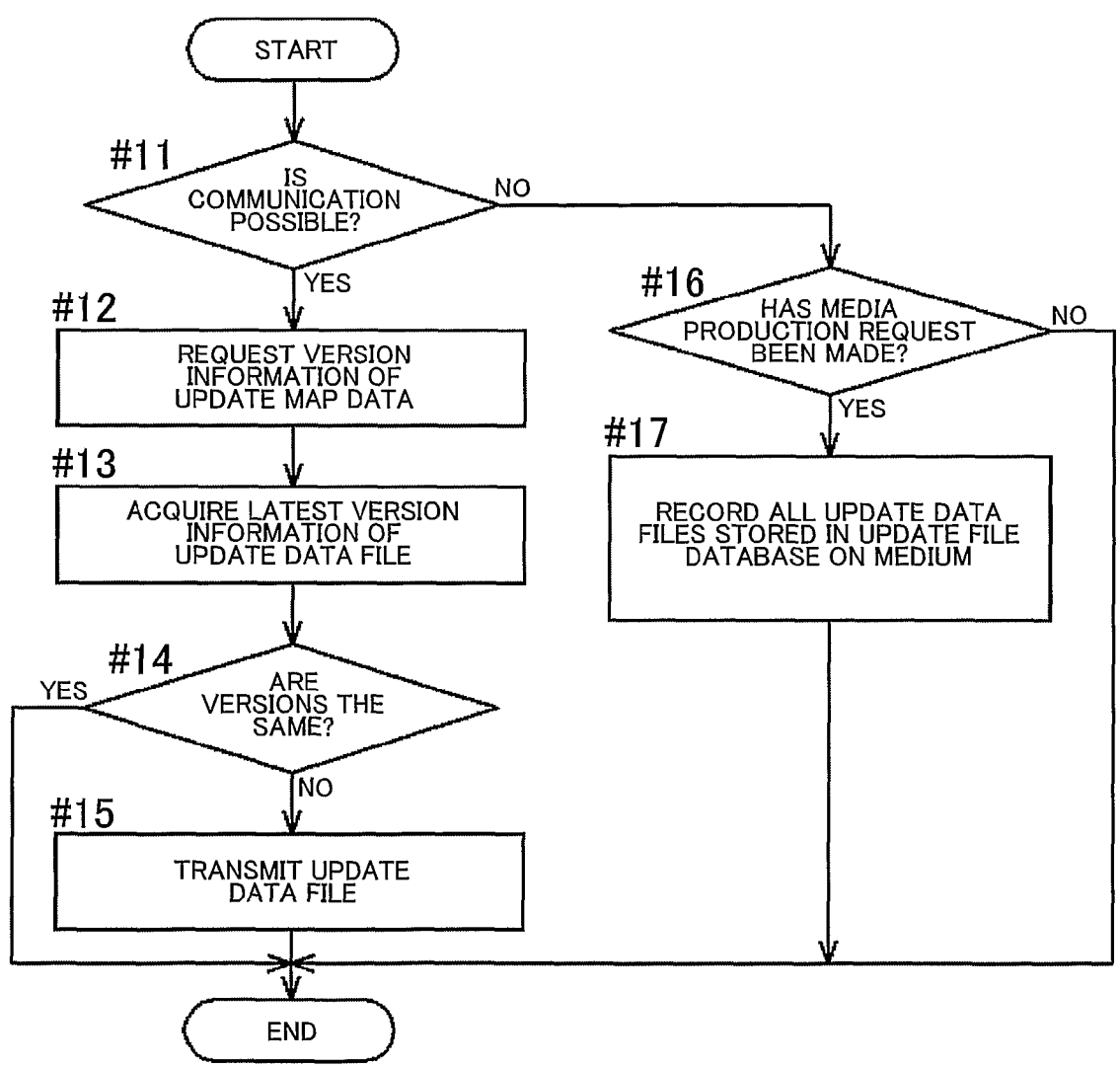
FIG. 11 is a flowchart of a method of providing the update data file to a navigation device.

Next, the method of providing the update data file Df to the navigation device 1 by the update data delivery server 4 is described based on the flowchart shown in FIG. 11. The update data delivery server 4 first determines whether or not the delivery unit 42 is in a state capable of communicating with the navigation device 1 (step #11). As described above, the delivery unit 42 performs the communication with the navigation device 1 via the radio base station 5 or via the communication network 6 and the update terminal 7. In the case where the communication with the navigation device 1 is possible (step #11: Yes), the delivery unit 42 then makes a request (step #12) to the navigation device 1 for version information showing the version of the update map data ML stored in the local save database 16. On the navigation device 1 side, the version data of each piece of the update map data ML for each compartment p stored in the local save database 16 is read out from the management data frame F10 (see FIG.

7) and transmitted to the update data delivery server 4 as the version information of the update map data ML for each compartment p.

Meanwhile, the delivery unit 42 acquires the latest version information of the update data file Df of each compartment p (step #13) based on the version data in the management data frame F20 (see FIG. 7) of each update data file Df stored in the update file database 41. Then, the delivery unit 42 compares the latest version information of the update data file Df of each compartment p acquired in the step #13 and the version information of the update map data ML for each compartment p received from the navigation device 1 to determine whether or not the versions are the same (step #14). The comparison of the versions is performed between the update data file Df and the update map data ML having the same compartment ID for each compartment p. In the case where the versions are not the same (step #14: No), i.e., the latest version of the update data file Df for the same compartment p is newer than the version of the update map data ML of the navigation device 1, all update data files Df newer than the version of the update map data ML are transmitted to the navigation device 1 (step #15). In the case where the versions are the same (step #14: Yes), i.e., the latest version of the update data file Df for the same compartment p is the same as the version of the update map data ML of the navigation device 1, the process is terminated without transmitting the update data file Df since the update by the update data file Df is unnecessary.

In the case where the delivery unit 42 is not in the state capable of communicating with the navigation device 1 (step #11: No), the update data delivery server 4 then determines whether or not a media production request has been made (step #16) by the operation unit (not shown) of the update data delivery server 4. In the case where the media production request has been made, all update data files Df stored in the update file database 41 are recorded on the recording medium Me (step #17). The produced recording medium Me recording the update data file Df is sent to the user, dealer, or the like of the navigation device 1 by mail or the like. The process is thus completed.

7. Method of Updating Reference Database of Navigation Device

Figure 12:
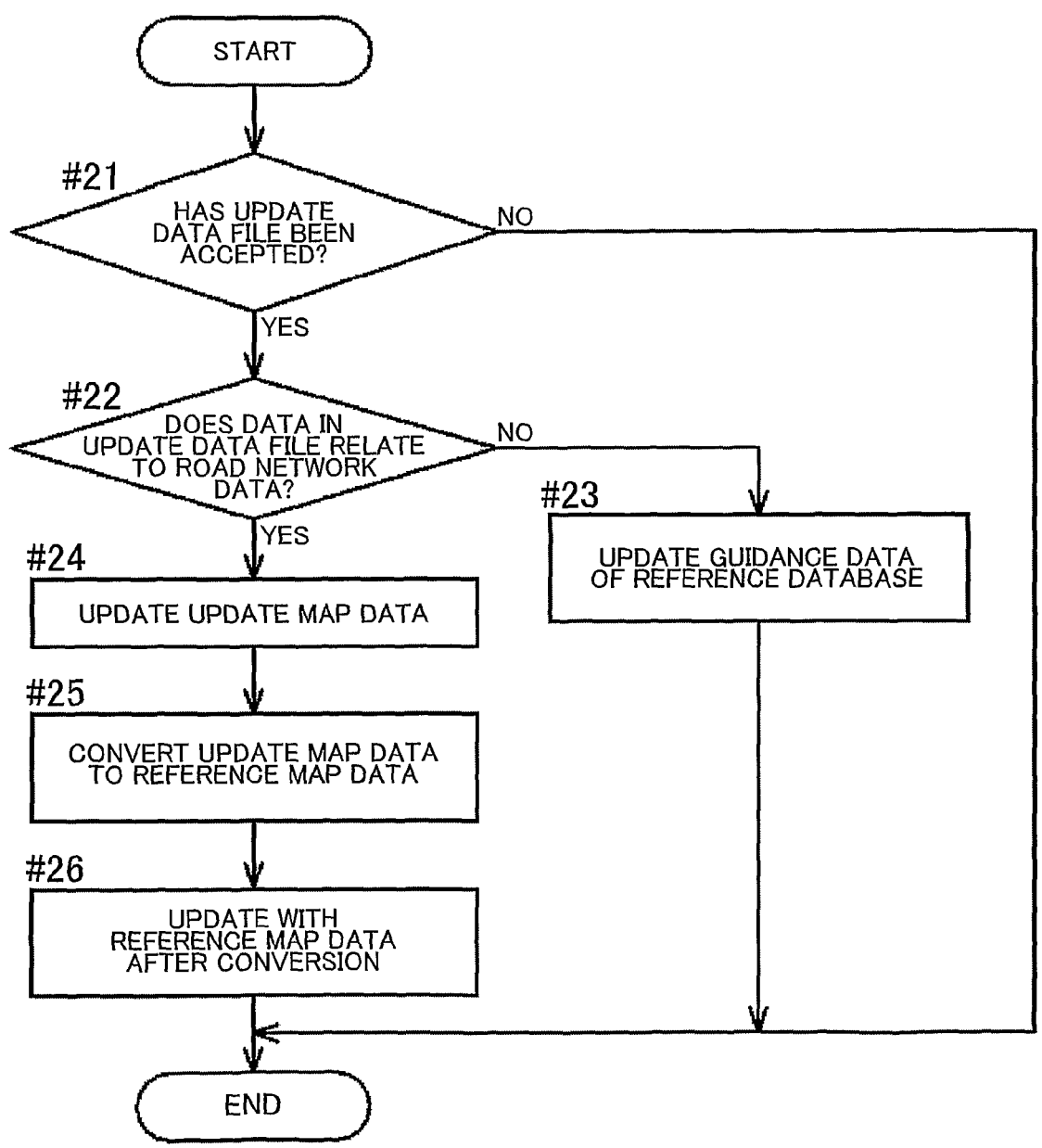
FIG. 12 is a flowchart of a method of updating the reference map data in the navigation device.

Next, a method of updating the reference map data MR in the reference database 19 of the navigation device 1 is described based on the flowchart shown in FIG. 12. In the case where the update data file Df is accepted by the update data file acceptance unit 13 (step #21: Yes), the data sort unit 14 of the navigation device 1 first sorts the data in the accepted update data file Df into data relating to the road network data RN and data relating to the guidance retrieval data GS (step #22). Then, the data relating to the guidance retrieval data GS (step #22: No) is sent to the reference map data update unit 18, and the reference map data update unit 18 directly updates the guidance retrieval data GS of the reference map data MR in the reference database 19 (step #23) with the data.

The data relating to the road network data RN (step #22: Yes) is sent to the update map data update unit 15, and the update map data update unit 15 updates the update map data ML (step #24) stored in the local save database 16. Next, the conversion unit 17 converts the update map data ML read out from the local save database 16 to the reference map data MR in the reference data format (step #25). Then, the reference map data update unit 18 replaces and updates the reference map data MR in the reference database 19 with the reference map data MR for each compartment p after the conversion by the conversion unit 17 (step #26). The process is thus completed.

Other Embodiments (1) In the embodiment described above, the configuration in which the data in the update data format is the update map data ML updatable by the update data file Df and in which the conversion unit 17 converts the update map data ML in the local save database 16 to the reference map data MR has been described as an example. However, the scope of application of the present invention is not limited thereto, and a configuration not including the update map data ML in the local save database 16 is also possible. In this case, the data in the update data format is data in the update data file Df for updating the reference map data MR. Further, in this case, the navigation device 1 does not include the data sort unit 14, the update map data update unit 15, and the local save database 16. Moreover, the conversion unit 17 converts the data in the update data file Df to data in the reference data format having an update content of the reference map data MR, and the reference map data update unit 18 performs a process of directly updating the reference map data MR in the reference database 19 with the data in the reference data format after the conversion.

(2) In the embodiment described above, the case where the display program AP1 and the map-matching program AP2 correspond to the "first program" of the present invention and the route search program AP3 corresponds to the "second program" of the present invention has been described as an example. However, the description is only exemplary, and other configurations are obviously possible. Therefore, for example, only one of the display program AP1 and the map-matching program AP2 may correspond to the "first program" of the present invention. Further, for example, the route search program AP3, the route direction program AP4, and the like other than the display program AP1 and the map-matching program AP2 may correspond to the "first program," and the display program AP1, the map-matching program AP2, the route direction program AP4, and the like other than the route search program AP3 may correspond to the "second program."

(3) In the embodiment described above, the case where the navigation program NP includes five application programs of the display program AP1, the map-matching program AP 2, the route search program AP3, the route direction program AP4, and the retrieval program AP5 as the plurality of application programs forming the navigation program NP has been described as an example. However, the specific contents of these application programs are only exemplary, and other configurations are obviously possible.

(4) In the embodiment described above, the configuration in which each data record of the update map data ML can be identified as the common map data record, the display/map-matching data record, or the route search data record based on the record code A01, B01, C01, . . . , and in which the conversion unit 17 performs the sort of the storage destination (data frames F01 to F04) based on the record code of each data record has been described as an example. However, the scope of application of the present invention is not limited thereto. For example, a configuration in which each data record of the update map data ML can be identified as the common map data record, the display/map-matching data record, or the route search data record based on the data alignment in each data frame F11 to F16 is also a preferred embodiment of the present invention. In this case, the conversion unit 17 performs the sort of the storage destination (data frames F01 to F04) based on the data alignment of each data record. Information relating to the alignment of each data record is stored in the management header or the like of the management data frame F10 of the update map data ML.

(5) The specific configurations of the reference map data MR in the reference data format, the update map data ML in the update data format, the update data file Df, and the like described in each embodiment above are only exemplary, and the data configurations may obviously be different from each embodiment described above.

(6) In each embodiment described above, the case where the content of the comparison local save database 33 of the update data generation server 3 is updated to match the content of the new local save database 34 after the update data file Df has been generated has been described as an example. While it is possible to erase the content of the comparison local save database 33 before the update, a configuration in which the content is saved in the comparison local save database 33 together with the version data is also one preferred embodiment. In this configuration, the comparison local save database 33 stores the update map data ML of a plurality of versions for each predetermined compartment p.

(7) In each embodiment described above, the configuration in which the update data generation server 3 generates the new update map data MLn in the new local save database 34 based on the new data, and generates the update data file Df based on the difference between the update map data ML in the comparison local save database 33 and the new update map data MLn has been described as an example. However, the configuration of the update data generation server 3 is not limited thereto. Therefore, for example, a configuration in which the update data generation server 3 generates the update data file Df from the new data and the update map data ML in the comparison local save database 33 without generating the new update map data MLn is also one preferred embodiment.

(8) In each embodiment described above, an example of the configuration in which the update data generation server 3 and the update data delivery server 4 form the server device 2 has been described. However, the configuration of the server device 2 is not limited thereto. For example, a configuration in which the function of the update data generation server 3 and the function of the update data delivery server 4 are integrated in one server device is one preferred embodiment.

INDUSTRIAL APPLICABILITY

The present invention can be utilized for a navigation device which operates according to a plurality of application programs including at least a first program and a second program and in which reference map data referred to by these application programs is updatable, and a data update system including the navigation device.

The invention claimed is:

1. A navigation device that operates according to a plurality of application programs including at least a first program and a second program, reference map data of a reference data format referred to by the application programs being updatable, the navigation device comprising:
a conversion unit that converts data in a predetermined update data format into data in the reference data format; and
a reference map data update unit that updates the reference map data with the data in the reference data format after conversion by the conversion unit; wherein
the reference map data is formed of a common map data frame commonly referred to by the plurality of application programs, a first map data frame referred to by the first program, and a second map data frame referred to by the second program;
the data in the update data format is formed by storing in each data frame divided for each data type, at least one of: a first group of one or more common map data records to be stored according to the data type of each data frame in the common map data frame after conversion by the conversion unit; a second group of one or more first map data records to be stored according to the data type of each data frame in the first map data frame after conversion by the conversion unit; and a third group of one or more second map data records to be stored according to the data type of each data frame in the second map data frame after conversion by the conversion unit; and
data stored in the common map data frame includes data relating to a road network formed by including a link and a node, and is commonly referred to by the plurality of application programs.

2. The navigation device according to claim 1, wherein
the data in the update data format is update map data updatable by a predetermined update data file;
the navigation device further comprises:
a local save database that stores the update map data; wherein
the conversion unit converts the update map data in the local save database to the reference map data.

3. The navigation device according to claim 2, wherein the update data file stores in each data frame divided for each data type, one or more of a common data record for updating the common map data records according to the data type of each data frame, a first update data record for updating the first map data records according to the data type of each data frame, and a second update data record for updating the second map data records according to the data type of each data frame.

4. The navigation device according to claim 2, wherein the conversion unit converts the update map data to the reference map data by sorting a plurality of data records included in the update map data and generating the common map data frame, the first map data frame, and the second map data frame of the reference map data.

5. The navigation device according to claim 1, wherein
the data in the update data format is data in the update data file for updating the reference map data; and
the conversion unit coverts the data in the update data file to data in the reference data format having an update content of the reference map data.

6. The navigation device according to claim 1, wherein
the first program is at least one of a display program and a map-matching program; and
data stored in the first map data frame includes data relating to a road shape of the road network of the reference map data.

7. The navigation device according to claim 1, wherein
the second program is a route search program; and
data stored in the second map data frame includes data relating to a traffic cost of each link forming the road network of the reference map data.

8. The navigation device according to claim 6, wherein
the second program is a route search program; and
data stored in the second map data frame includes data relating to a traffic cost of each link forming the road network of the reference map data.

9. The navigation device according to claim 1, wherein the data in the reference data format is formed with the data records stored in at least one of the data frame being aligned in the order of road network connection.

10. A data update system comprising:

the navigation device according to claim 2; and a server device that provides an update data file to the navigation device, the server device including:

a comparison local save database that stores the same update map data as that of the local save database;

a new data acceptance unit that accepts an input of new data; and an update data file generation unit that generates the update data file based on the update map data in the comparison local save database and the new data.

11. The data update system according to claim 10, wherein the server device further comprises:

a new update map data generation unit that generates new update map data updated with a content of the new data based on the update map data stored in the comparison local save database and the new data; wherein the update data file generation unit generates the update data file based on the difference between the update map data stored in the comparison local save database and the new update map data.

\* \* \* \* \*